US007466530B2

(12) United States Patent
Bobert et al.

(10) Patent No.: US 7,466,530 B2

(45) Date of Patent: Dec. 16, 2008

(54) SURGE ARRESTER

(75) Inventors: Peter Bobert, Falkensee (DE); Michael Mewes, Berlin (DE)

(73) Assignee: EPCOS AG, Munich (DE)

( * ) Notice: Subject to any disclaimer, the term of this patent is extended or adjusted under 35 U.S.C. 154(b) by 1 day.

(21) Appl. No.: 11/604,658

(22) Filed: Nov. 27, 2006

(65) Prior Publication Data

US 2007/0127183 A1 Jun. 7, 2007

Related U.S. Application Data

(63) Continuation of application No. PCT/DE2005/000715, filed on Apr. 19, 2005.

(30) Foreign Application Priority Data

May 27, 2004 (DE) ...................... 10 2004 025 912

(51) Int. Cl.
*H02H 9/00* (2006.01)

(52) U.S. Cl. ...................................................... 361/124

(58) Field of Classification Search .................. 361/124
See application file for complete search history.

(56) References Cited

U.S. PATENT DOCUMENTS

| | | | | |
|---|---|---|---|---|
| 4,034,326 | A | 7/1977 | Hill et al. | |
| 4,275,432 | A | 6/1981 | Napiorkowski | |
| 5,282,109 | A | 1/1994 | Smith | |
| 5,384,679 | A * | 1/1995 | Smith | 361/119 |
| 5,450,273 | A | 9/1995 | Boy | |
| 6,710,996 | B2 | 3/2004 | Bobert et al. | |
| 6,795,290 | B2 * | 9/2004 | Bobert et al. | 361/129 |
| 2001/0019471 | A1 | 9/2001 | Richter et al. | |

FOREIGN PATENT DOCUMENTS

| | | | |
|---|---|---|---|
| DE | 42 36 538 | A1 | 4/1994 |
| DE | 100 00 617 | A1 | 7/2001 |
| DE | 101 34 752 | A1 | 3/2003 |
| FR | 2 466 853 | | 4/1981 |
| WO | WO 96/05639 | | 2/1996 |

* cited by examiner

*Primary Examiner*—Stephen W Jackson
(74) *Attorney, Agent, or Firm*—Slater & Matsil, L.L.P.

(57) ABSTRACT

A surge arrester includes an outer electrode and an other electrode. An electrically conductive contact element is spaced apart from the outer electrode by an air gap. The electrically conductive contact element is pretensioned by a spring mechanism that exerts a spring force on the contact element in the direction towards the outer electrode. An electrically conductive connection is located between the other electrode and the contact element. The air gap between the outer electrode and the contact element is arranged in a tightly enclosed hollow space.

24 Claims, 3 Drawing Sheets

SURGE ARRESTER

This application is a continuation of co-pending International Application No. PCT/DE2005/000715, filed Apr. 19, 2005, which designated the United States and was not published in English, and which is based on German Application No. 10 2004 025 912.7 filed May 27, 2004, both of which applications are incorporated herein by reference.

TECHNICAL FIELD

The invention relates to a surge arrester with a short-circuit mechanism between an outer electrode and another electrode.

BACKGROUND

Surge arresters of the type named above are typically used for protecting telecommunications devices from transient surges, like those from lightning strikes, for example. Here, by triggering the surge arrester, the outer electrode is short-circuited to the center electrode by means of an electric arc. As soon as the surge goes away, the electric arc is extinguished and the arc gap between the center and outer electrode is again isolated.

In order to maintain the just described protective function even for the loss of a surge arrester, arresters with additional functions can also be equipped. In this connection, mechanisms for protecting the arrester from thermal overloading are known (fail-safe), in which a fusible element made from solder material or also an insulating film is arranged between a spring clip and the outer electrode, which allows the movement of the spring clip, which then bridges and thus short-circuits the arc gap of the arrester between the center electrode and the outer electrode, when the temperature is too high.

Such a surge arrester is known, e.g., from the publication DE 101 34 752. The short-circuit mechanism is triggered by heat in the case of a fault.

One problem to be solved is to present a surge arrester, which is distinguished in the case of a fault by a secure contact between the short-circuiting electrodes.

SUMMARY OF THE INVENTION

According to at least one embodiment of the invention, a surge arrester is presented with a ceramic body, at least one outer electrode, and at least one other electrode, in which an electrically conductive contact element is provided, spaced apart from the outer electrode by an air gap and pretensioned in the normal case by a spring mechanism. The spring mechanism exerts a spring force on the contact element in the direction towards the outer electrode. There is an electrically conductive connection between the other electrode and the contact element. The air gap between the outer electrode and the contact element is arranged in a preferably hermetically tightly sealed hollow space. The spring mechanism pretensioning the contact element is triggered by heat, e.g., in the case of a fault, wherein the contact element is released and pressed onto the outer electrode by the spring force and in this way a short circuit is created between the outer electrode and the other electrode.

The other electrode is preferably a center electrode arranged between two outer electrodes.

Because the hollow space is enclosed, it is protected from gel when the arrester is embedded in a silicone gel. The gel is used, for example, as moisture protection for the arrester.

The contact element is preferably arranged completely within a tightly enclosed hollow space. The hollow space can be identical to the air gap.

The electrically conductive connection between the center electrode and the contact element is preferably constructed in the form of a spring clip fixed to the center electrode. The spring clip exerts a spring force on an electrically conductive contact element spaced apart from the outer electrode.

The contact element can be fixed in an opening of a metal plate, e.g., by means of a fusible mass. This metal plate is embedded at least partially with a positive fit in an insulating holder arranged between the metal plate and the outer electrode.

In an especially preferred embodiment, for an unmelted mass, the contact element is spaced apart from the outer electrode. For a melted mass, the contact element is pressed against the outer electrode by the spring clip.

In one variant of the invention, the contact element projects into an opening of the metal plate and is fixed in this metal plate by means of a fusible mass. The contact element is preferably constructed as a metal bolt.

The fusible mass (e.g., solder, preferably soft solder) ensures a tight seal of the enclosed hollow space. The fusible mass is necessary to fix the contact element in the metal plate and can be provided in a small quantity that must ensure that the contact element is fixed in the metal plate. The attachment of the contact element in the metal plate can be produced for corresponding dimensioning of the bolt or the hole with a very small quantity of fusible mass, whereby the advantage of a quick trigger mechanism is produced.

The metal plate with the preferably positive fit-joined metal bolt, which is preferably soft-soldered into the opening of the metal plate, is preferably arranged with a positive fit in an offset area of an insulating holder, which is constructed, e.g., as an insulating disk.

On the outwardly facing end of the metal bolt, a spring force is exerted in the direction of the outer electrode for pretensioning an electrically conductive spring clip attached to the center electrode. The spring clip is also used as the electrical connection between the center electrode and the metal bolt. The spring clip is preferably made from spring material, e.g., spring steel.

The spring clip forms the spring mechanism. The spring clip, the metal plate, and the contact element together form a short-circuit mechanism.

In the case of a fault, impermissibly high heating is generated in the arrester, wherein the fusible mass melts, which is why the contact element is pressed by the spring clip against the outer electrode, with a short circuit being generated between the center and outer electrodes.

In another variant of the invention, the short-circuit mechanism includes a metal plate electrically connected to the center electrode and a spring contact element, which has a spring constructed preferably as a leaf spring, whose fixed end is preferably attached to the metal plate and whose free end is preferably held in the pretensioned state at a distance from the outer electrode when the fusible mass is not melted. The spring mechanism is formed in this case by the spring contact element itself.

The spring is preferably constructed as a leaf spring folded together, i.e., with a meander-shaped cross section with several meander sections, wherein the opposing sides of respective meander sections are pressed together elastically by a fusible mass or are soft-soldered together with pretensioning. The leaf spring is held in a pretensioned state at a distance from the outer electrode in the normal case by the fusible mass.

If the fusible mass melts and in this way loses its strength, then the folded leaf spring unfolds and generates a short circuit between the metal plate and the outer electrode.

This variant of the invention has the advantage especially in the use of a viscous gel in the surroundings of the arrester, because the spring mechanism is arranged completely in the enclosed hollow space and is therefore isolated from the surroundings. Through the complete separation from the surroundings, the gel can no longer prevent the movement of the released spring element.

The center and outer electrodes are preferably made from copper. The coefficient of thermal expansion of the copper differs greatly from that of the ceramic, which can negatively affect the tightness of the interface between the ceramic body and the outer electrode for temperature loading. For equalizing the difference in the coefficients of thermal expansion between the ceramic body and the copper (Cu) electrode, a ring or frame is used, which is attached to the outer electrode (preferably hard-soldered). As the material of the ring, preferably a material is used with a coefficient of thermal expansion, which is approximately equal to the coefficient of expansion of the ceramic body, e.g., iron-nickel alloy (FeNi).

In a preferred variant, the insulating holder is preferably joined to the ring (e.g., FeNi ring) or frame with a positive fit. Here, a tightly enclosed hollow space, in which the air gap is arranged between the outer electrode and the contact element, is produced between the outer electrode, the insulating holder, and the metal disk. The insulating holder can be used, e.g., for an outer electrode made from FeNi or a material that is similar in terms of thermal expansion in an offset area of the outer electrode. In the latter case, the ring or frame can be eliminated.

In a preferred variant, the metal plate is pressed into the insulating holder and the insulating holder is pressed into the ring. In this way, the penetration of gel into the enclosed hollow space or into the air gap is prevented.

The metal plate preferably consists of brass or another suitable metal or a metal alloy.

The insulating holder is preferably composed of a temperature-resistant plastic, whose melting temperature lies above the melting temperature of the fusible mass, which typically equals about 220° C. The plastic is preferably distinguished by a good spring effect, which guarantees a good force fit between the insulating holder and the metal disk.

In the case of a fault, i.e., when a certain limit voltage $U_{max}$ is exceeded, a spark discharge is produced between the center and outer electrode, which heats the electrodes.

The heat generated at the outer electrode is transferred to the contact element and the metal disk through heat radiation of the outer electrode in the direction of the enclosed hollow space. The heat generated at the center electrode is transferred to the contact element or the metal disk through the spring clip.

BRIEF DESCRIPTION OF THE DRAWINGS

Below, the arrester is explained in more detail with reference to the embodiments and the associated figures. The figures show various embodiments with reference to schematic and are not true-to-scale representations. Equivalent or identically functioning parts are designated with the same reference symbols.

Figure 1A:
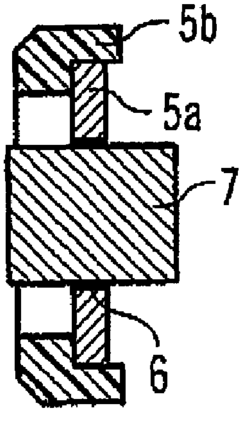
FIG. 1A shows a section of a spring mechanism of an arrester shown in FIG. 2.

The following provides a list of reference symbols used in conjunction with the drawings:

1 Center electrode
2 Outer electrode
3 Spring clip
5*a* Metal plate
5*b* Insulating holder
5*c* Metal plate
6 Fusible mass
7 Contact element
11 Section of the contact element 7
12 Tapered section of the contact element 7
16 Ring made from an iron-nickel alloy (FeNi)
19 Ceramic body
20 Air gap between the contact element 7 and the outer electrode 2
22 Hollow space
21 Leaf spring
21*a* Fixed end of leaf spring 21
21*b* Free end of leaf spring 21
F Spring force

DETAILED DESCRIPTION OF ILLUSTRATIVE EMBODIMENTS

Figure 1B:
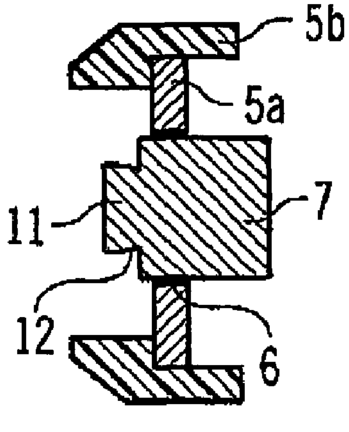
FIG. 1B shows a section of a spring mechanism with a tapered contact element.
Figure 2:
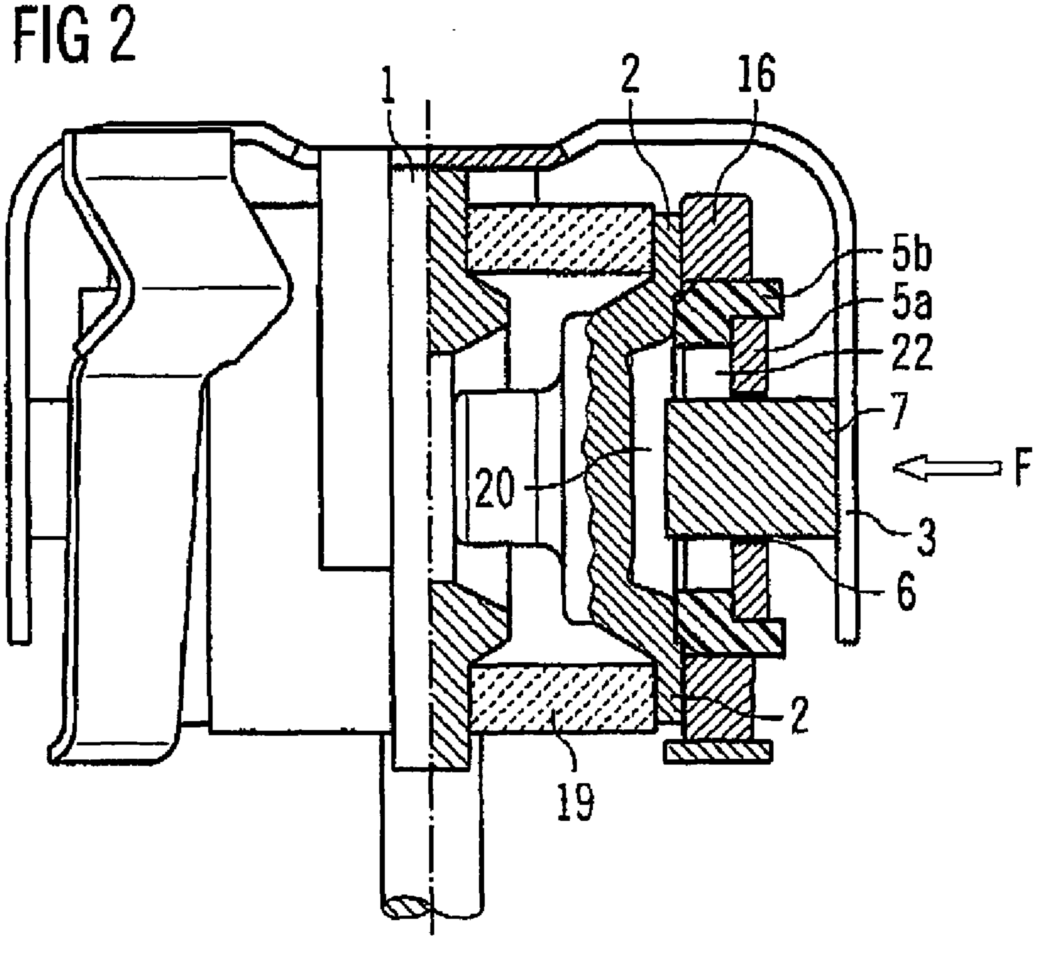
FIG. 2 shows an arrester in the normal state.
Figure 3:
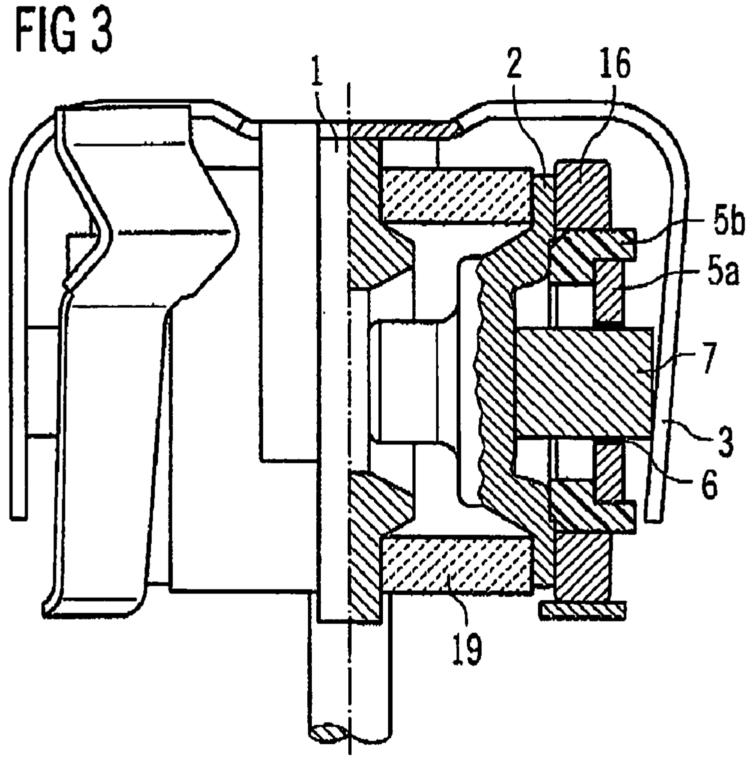
FIG. 3 shows the arrester according to FIG. 2 when the spring mechanism is triggered in the case of a fault.

In example surge arrester is shown in FIGS. 2 and 3 before and after the spring mechanism is triggered, respectively. FIG. 1A shows a schematic cross section of a spring mechanism of a surge arrester shown in FIG. 2. FIG. 1B shows an alternate embodiment spring mechanism.

Referring to these Figures, the contact element 7 has the shape of a round bolt, which projects through a round hole into a metal plate 5*a*. The mechanical connection between the contact element 7 and the metal plate 5*a* is produced by a fusible mass 6 along the hole edge of the metal plate 5*a*. The metal bolt is soft soldered into a metal plate 5*a*.

The fusible mass can be constructed as solder in an advantageous embodiment of the invention. In connection with materials that can be soldered for the contact element and the spacer element, a very simple connection between the contact element and spacer element is possible. In addition, the tin alloys used for solder ensure that the connection between the contact element and the spacer element is broken quickly when there is sufficient heat.

The metal plate 5*a* has preferably a central opening for holding the contact element 7. The metal plate 5*a* preferably has the shape of a disk, which is inserted into an insulating holder 5*b*. The insulating holder 5*b* has an offset region for holding the metal plate 5*a*.

The contact element 7 can have a tapered section 12, as shown in FIG. 1B, on a section 11 lying between the outer electrode 2 and the metal plate 5*a*.

The spring mechanism further includes an electrically conductive spring clip 3, which is fixed to the center electrode 1 of the arrester, see FIGS. 2 and 3. The spring clip 3 overlaps the end of the outer electrode 2 and keeps the contact element 7 in a pretensioned state by exerting a spring force F in the direction of the outer electrode 2 on the outer end surface of the contact element 7.

The spring clip 3, the metal plate 5*a*, and the contact element 7 are constructed so that when the fusible mass 6 melts, the spring clip 3 and the contact element 7 can slide along the opening of the metal plate 5*a*.

In one variant of the invention, the contact element can be connected mechanically rigidly to the spring clip 3 or can be a component of the spring clip 3.

A hollow space 22 is formed between the contact element 7, the metal plate 5*a*, the insulating holder 5*b*, and the outer electrode 2. The hollow space 22 is sealed by the fusible mass 6. The metal plate 5*a* is sealed, e.g., by a force fit against the ring 16 and the insulating holder 5*b*. The ring 16 is soldered or welded onto the outer electrode 2. Thus, a tight seal of the hollow space against gel and possible moisture is achieved.

A gas-filled ceramic body 19 is arranged between the center electrode 1 and the outer electrode 2. The ceramic body is preferably filled with a noble gas. The arrester preferably has two outer electrodes and a symmetric construction relative to the center electrode. The center electrode 1 is preferably arranged between two ceramic bodies. The center or outer electrodes 1 and 2 are each connected to the ceramic bodies 19 by soldering.

The center and outer electrodes 1 and 2 are preferably made from copper (Cu). It is also possible, however, in another variant for the center and/or outer electrode to be made from FeNi.

A ring 16, which is preferably made from an iron-nickel alloy (FeNi), is arranged on the outer electrode 2 at the edge. The insulating holder 5*b* is inserted into the ring 16. The outer electrode 2 has a recess for forming an air gap 20 in the region facing the contact element 7. The air gap 20 is arranged in the tightly enclosed hollow space 22.

FIG. 2 corresponds to the normal state of the surge arrester, i.e., the state before the spring mechanism is triggered. Through a corresponding configuration of the dimensions of the elements involved in the protective mechanism it can be achieved that the spring clip 3 displaces the contact element 7 far enough in the direction towards the outer electrode 2 that the contact element 7 presses onto the outer electrode 2 under the application of a contact pressure, which originates, in turn, from the spring clip 3 (residual spring force), whereby the electrical contacting of the outer electrode 2 with the spring clip 3, and consequently with the center electrode 1, is effected when the short-circuit mechanism is triggered.

In the case of a fault, the fusible mass 6 melts due to the heat generated in the surroundings of the arrester. Here, the contact element 7 is released and pressed by the spring force F of the spring clip 3 onto the outer electrode 2, see FIG. 3. In this case, the center electrode 1 and the outer electrode 2 are short-circuited via the spring clip and the contact element 7.

FIGS. 4A to 6 show another embodiment, in which the contact element 7 is pretensioned by elastic deformation.

The contact element 7 has a leaf spring 21 with a fixed end 21*a* and a free end 21*b*. The fixed end 21*a* of the leaf spring is fixed to the metal plate 5*c*, i.e., hard-soldered. The free end 21*b* of the leaf spring is pretensioned to the metal plate 5*c* or another section (e.g., fixed end) of the leaf spring through soft soldering.

Figure 4B:
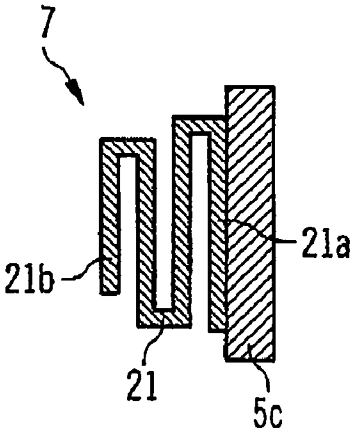
FIG. 4B shows the spring mechanism according to FIG. 4A when the spring mechanism is triggered in the case of a fault.
Figure 4A:
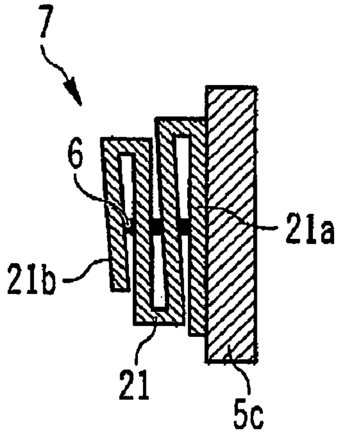
FIG. 4A shows a section of a spring mechanism of an arrester shown in FIG. 5 in the pretensioned state.

It is advantageous if the leaf spring 21, as shown schematically in FIG. 4A, is constructed in the form of an "accordion," whose folded sections are held together and thus pretensioned by soft soldering in the normal state.

The leaf spring 21 and the spring clip 3 can be fabricated from, e.g., copper beryllium (CuBe).

In the case of a fault, the fusible mass melts, wherein the leaf spring pretensioned by the folding is released. The folded-up leaf spring springs apart. FIG. 4B shows the leaf spring unfolded after the spring mechanism is triggered.

Figure 4C:
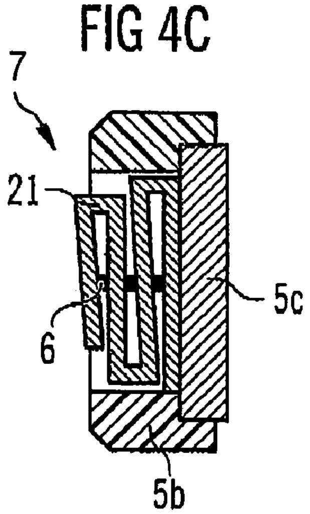
FIG. 4C shows the spring mechanism according to FIG. 4A inserted into a holder.

FIG. 4C shows the spring mechanism according to FIG. 4A inserted into the insulating holder 5*b*.

Figure 5:
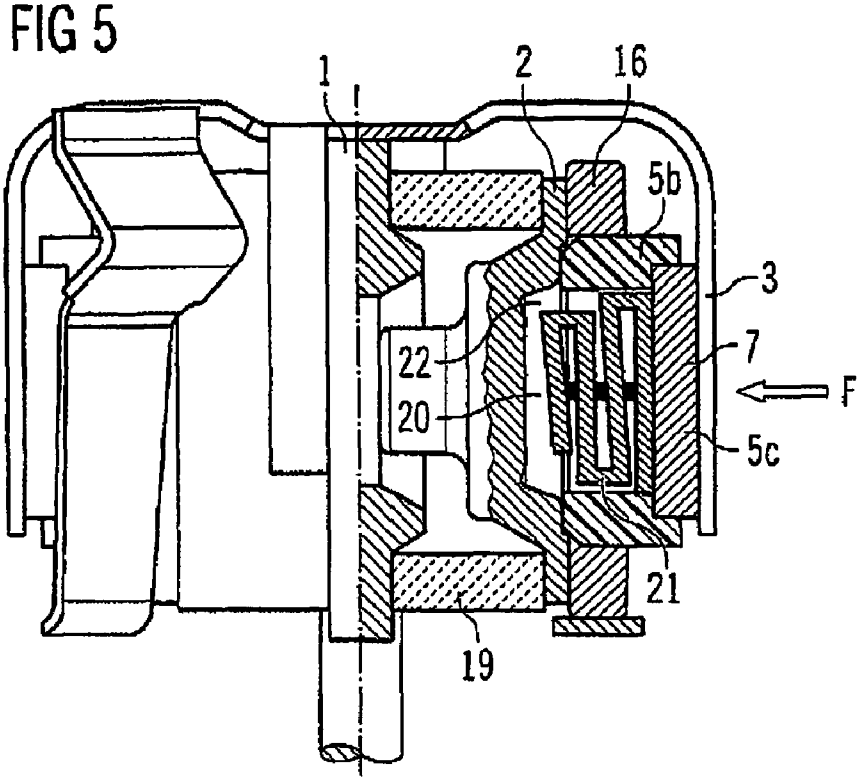
FIG. 5 shows another arrester in the normal state.
Figure 6:
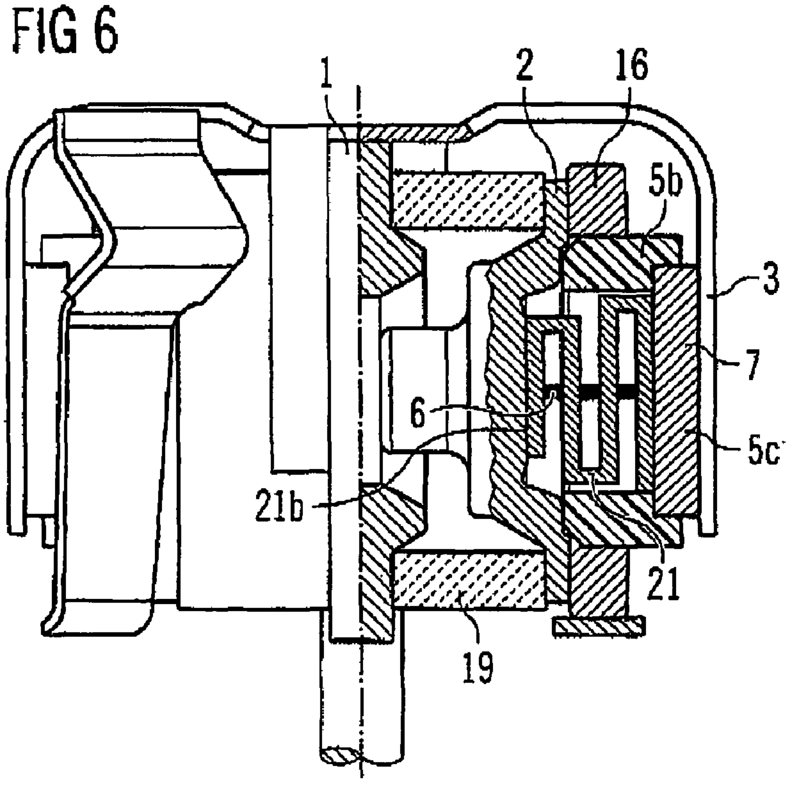
FIG. 6 shows the arrester according to FIG. 5 when the spring mechanism is triggered in the case of a fault.

In FIGS. 5 and 6, the spring mechanism shown schematically in FIGS. 4A and 4B is shown before and after the response, respectively.

The structure shown in FIG. 4C is inserted into the ring 16 or into an offset area of the outer electrode 2, as shown in FIG. 5, preferably by a force fit. Here, the metal plate 5*c* is pressed by the spring force of the spring clip 3 against the insulating holder. The metal plate 5*c* has no openings.

In this variant of the invention, the closed hollow space 22 is formed between the outer electrode 2, the insulating holder 5*b*, and the metal plate 5*c*. Moving parts of the spring mechanism (i.e., the contact element constructed as a leaf spring) are here arranged completely within the enclosed hollow space 22.

In FIG. 5 it can be seen that the free end of the leaf spring 21 is held at a distance from the outer electrode 2, with an air gap 20 being formed between, which gap is to be bridged in the case of a fault.

In FIG. 6, the surge arrester according to FIG. 5 is shown after the spring mechanism is triggered. The fusible mass 6 was softened by the heat of the spark discharge. The free end of the leaf spring is pressed by the spring force against the outer electrode 2 and thus establishes the secure contact between the outer and center electrodes via the metal disk and the spring clip.

Although only a limited number of possible improvements of the invention could be described in the embodiments, the invention is not limited to these improvements. In principle, it is possible to replace the force fit of the inserted parts by another type of embedding, e.g., casting. The invention is not limited to the number of schematically shown elements. The described safety mechanism is obviously not limited to the protection of only one arc gap between the center electrode 1 and the outer electrode 2. Through symmetric expansion, the second arc gap between the center electrode 1 and the other outer electrode can also be protected in a corresponding way.

What is claimed is:

1. A surge arrester comprising:

an outer electrode;

an other electrode;

an electrically conductive contact element spaced apart from the outer electrode by an air gap, the electrically conductive contact element being pretensioned by a spring mechanism that exerts a spring force on the electrically conductive contact element in the direction towards the outer electrode; and an electrically conductive connection between the other electrode and the contact element;

wherein the air gap between the outer electrode and the electrically conductive contact element is arranged in a tightly enclosed hollow space.

2. The surge arrester according to claim 1, wherein the electrically conductive connection between the other electrode and the electrically conductive contact element comprises a spring clip fixed to the other electrode.

3. The surge arrester according to claim 1, further comprising a spring clip that exerts a spring force on the electrically conductive contact element, which is spaced apart from the outer electrode.

4. The surge arrester according to claim 1, wherein the electrically conductive contact element is fixed in an opening of a metal plate by means of a fusible mass, wherein the metal plate is embedded at least partially with a positive fit in an insulating holder, the insulating holder being arranged between the metal plate and the outer electrode.

5. The surge arrester according to claim 1, further comprising a fusible mass adjacent the electrically conductive contact element, wherein the contact element is kept spaced apart from the outer electrode when the fusible mass comprises an unmelted mass.

6. The surge arrester according to claim 5, further comprising a spring clip that exerts a spring force on the electrically conductive contact element, wherein the electrically conductive contact element is pressed against the outer electrode by the spring clip when the fusible mass comprises a melted mass.

7. The surge arrester according to claim 4, wherein the hollow space is bordered by the electrically conductive contact element, the metal plate, the insulating holder, and the outer electrode.

8. The surge arrester according to claim 1, wherein the hollow space is sealed by a fusible mass.

9. The surge arrester according to claim 2, wherein the electrically conductive contact element is mechanically connected rigidly to the spring clip or is a component of the spring clip.

10. The surge arrester according to claim 2, wherein the electrically conductive contact element has the shape of a bolt.

11. The surge arrester according to claim 4, wherein the metal plate comprises a disk.

12. The surge arrester according to claim 11, wherein the electrically conductive contact element has a tapered section on a section lying between the outer electrode and the metal plate.

13. The surge arrester according to claim 4, wherein the fusible mass comprises solder.

14. The surge arrester according to claim 1, wherein the outer electrode includes a ring made from an iron-nickel alloy at an edge of the outer electrode.

15. The surge arrester according to claim 2, wherein the spring clip is made from spring steel.

16. The surge arrester according to claim 1, wherein the contact element is arranged in the tightly enclosed hollow space.

17. The surge arrester according to claim 16, further comprising an electrically conductive metal plate at least partially embedded in an insulating holder, wherein the electrically conductive contact element has a spring with a fixed end rigidly connected to the metal plate.

18. The surge arrester according to claim 17, wherein a free end of the spring is held at a distance from the outer electrode by a fusible mass when the fusible mass comprises an unmelted mass.

19. The surge arrester according to claim 18, wherein the free end of the spring is pressed against the outer electrode when the fusible mass comprises a melted mass.

20. The surge arrester according to claim 17, wherein the spring is constructed as a leaf spring.

21. The surge arrester according to claim 17, wherein the electrically conductive connection between the other electrode and the electrically conductive contact element comprises a spring clip that is fixed to the other electrode and that presses against the metal plate.

22. The surge arrester according to claim 21, wherein the spring is constructed as a folded leaf spring, wherein the folds of the leaf spring are pretensioned elastically by a fusible mass.

23. The surge arrester according to claim 1, wherein the surge arrester is embedded in a gel.

24. The surge arrester according to claim 1, wherein the other electrode comprises a center electrode.

* * * * *